United States Patent
Mendis et al.

(10) Patent No.: US 8,259,022 B2
(45) Date of Patent: Sep. 4, 2012

(54) ULTRA LOW LOSS WAVEGUIDE FOR BROADBAND TERAHERTZ RADIATION

(75) Inventors: Rajind Mendis, Houston, TX (US); Daniel M. Mittleman, Houston, TX (US)

(73) Assignee: William Marsh Rice University, Houston, TX (US)

(*) Notice: Subject to any disclaimer, the term of this patent is extended or adjusted under 35 U.S.C. 154(b) by 582 days.

(21) Appl. No.: 12/434,454

(22) Filed: May 1, 2009

(65) Prior Publication Data
US 2009/0273532 A1    Nov. 5, 2009

Related U.S. Application Data

(60) Provisional application No. 61/049,887, filed on May 2, 2008.

(51) Int. Cl.
*H01Q 13/10* (2006.01)
(52) U.S. Cl. .................. 343/771; 343/700 MS
(58) Field of Classification Search .......... 343/700, 343/771; 333/237; 250/338.1
See application file for complete search history.

(56) References Cited

U.S. PATENT DOCUMENTS

| | | | | |
|---|---|---|---|---|
| 3,170,158 | A * | 2/1965 | Rotman | 342/376 |
| 3,697,993 | A * | 10/1972 | Jones et al. | 342/161 |
| 4,129,872 | A * | 12/1978 | Toman | 343/768 |
| 4,488,157 | A * | 12/1984 | Terakawa et al. | 343/771 |
| 7,419,887 | B1 * | 9/2008 | Quick et al. | 438/479 |
| 2009/0134329 | A1 * | 5/2009 | Kasai et al. | 250/338.1 |
| 2011/0063054 | A1 * | 3/2011 | Mendis et al. | 333/230 |

OTHER PUBLICATIONS

Abele, Thomas A., et al., "A high-capacity digital communication system using TE01 transmission in circular waveguide," Apr. 1975, pp. 326-333, vol. MTT-23, No. 4, IEEE Transactions on Microwave Theory and Techniques.
Bingham, A. L., et al., "High Q, one-dimensional terahertz photonic waveguides," Applied Physics Letters, 2007, pp. 091105-1 to 091105-3, vol. 90, American Institute of Physics.
Bingham, A. L., et al., "Terahertz two-dimensional high-Q photonic crystal waveguide cavities," Optics Letters, Feb. 15, 2008, pp. 348-350, vol. 33, No. 4, Optical Society of America.
Cao, Hua, et al., "Broadband generation of terahertz radiation in a waveguide," Optics Letters, Aug. 1, 2004, pp. 1751-1753, vol. 29, No. 15, Optical Society of America.
Coleman, S., et al., "Parallel plate THz transmitter," Applied Physics Letters, Feb. 2, 2004, pp. 654-656, vol. 84, No. 5, American Institute of Physics.

(Continued)

*Primary Examiner* — Tho G Phan
(74) *Attorney, Agent, or Firm* — Conley Rose, P.C.; Rodney B. Carroll

(57) ABSTRACT

An apparatus comprising a parallel plate waveguide (PPWG) comprising two plates separated by a distance that supports a multimode wave, and a transmitter configured to emit a wave having a frequency from about one hundred Gigahertz (GHz) to about ten terahertz (THz) and to couple to one mode of the PPWG. Also disclosed is an apparatus comprising two plates substantially parallel to one another and separated by at least about five millimeters (mm), and an antenna coupled to the two plates and configured to transmit or receive a wave having a frequency from about one hundred GHz to about ten THz. Disclosed is a method comprising polarizing an electromagnetic beam in the first transverse electric ($TE_1$) mode with respect to a PPWG comprising two plates, adjusting the diameter of the electromagnetic beam based on the separation between the plates, and sending the electromagnetic beam into the PPWG.

22 Claims, 11 Drawing Sheets

OTHER PUBLICATIONS

Cooke, D. G., et al., "Optical modulation of terahertz pulses in a parallel plate waveguide," Optics Express, Sep. 15, 2008, pp. 15123-15129, vol. 16, No. 19, Optical Society of America (OSA).

Debus, Christian, et al., "Frequency selective surfaces for high sensitivity terahertz sensing," Applied Physics Letters, 2007, pp. 184102-1 to 184102-3, vol. 91, American Institute of Physics.

George, Paul A., et al., "Integrated waveguide-coupled terahertz microcavity resonators," Applied Physics Letters, 2007, pp. 191122-1 to 191122-3, vol. 91, American Institute of Physics.

George, Paul A., et al., "Microfluidic devices for terahertz spectroscopy of biomolecules," Optics Express, Feb. 4, 2008, pp. 1577-1582, vol. 16, No. 3, Optical Society of America (OSA).

Harsha, S. Sree, et al., "High-Q terahertz Bragg resonances within a metal parallel plate waveguide," Applied Physics Letters, 2009, pp. 091118-1 to 091118-3, vol. 94, American Institute of Physics.

Henzie, Joel, et al., "Multiscale patterning of plasmonic metamaterials," www.nature.com/naturenanotechnology, Sep. 2007, pp. 549-554, vol. 2, Nature Publishing Group.

Jeon, Tae-In, et al., "THz Sommerfeld wave propagation on a single metal wire," Applied Physics Letters, 2005, pp. 161904-1 to 161904-3, vol. 86, American Institute of Physics.

Jiang, Y, et al., "Improved performance of an optically pumped FIR laser using metallic waveguide," Rev. Sci. Instrum., Oct. 1992, pp. 4672-4674, vol. 63, No. 10, American Institute of Physics.

Kiwa, Toshihiko, et al., "A terahertz chemical microscope to visualize chemical concentrations in microfluidic chips," Japanese Journal of Applied Physics, 2007, pp. L1052-L1054, vol. 46, No. 44, The Japan Society of Applied Physics.

Kurt, Hamza, et al., "Coupled-resonator optical waveguides for biochemical sensing of nanoliter volumes of analyte in the terahertz region," Applied Physics Letters, 2005, pp. 241119-1 to 241119-3, vol. 87, American Institute of Physics.

Kuswandi, Bambang, et al., "Optical sensing systems for microfluidic devices: a review," Analytica Chimica Acta, 2007, pp. 141-155, vol. 601, Elsevier B.V.

Laman, N., et al., "High-resolution waveguide THz spectroscopy of biological molecules," Biophysical Journal, Feb. 2008, pp. 1010-1020, vol. 94, No. 3, Biophysical Society.

Liu, Q., et al., "Refractive-index sensor based on long-range surface plasmon mode excitation with long-period waveguide grating," Optics Express, May 11, 2009, pp. 7933-7942, vol. 17, No. 10, Optical Society of America (OSA).

Lu, Xinchao, et al., "Terahertz localized plasmonic properties of subwavelength ring and coaxial geometries," Applied Physics Letters, 2009, pp. 181106-1 to 181106-3, vol. 94, American Institute of Physics.

Melinger, Joseph S., et al., "Line narrowing of terahertz vibrational modes for organic thin polycrystalline films within a parallel plate waveguide," Applied Physics Letters, 2006, pp. 251110-1 to 251110-3, vol. 89, American Institute of Physics.

Mendis, Rajind, et al., "A beam-scanning THz prism with effective refractive index less than unity," undated but admitted to be prior art, 1 page, (presented at the International Workshop on Optical Terahertz Science and Technology, California, USA, 2009).

Mendis, Rajind, et al., "An investigation of the lowest-order transverse-electric (TE1) mode of the parallel-plate waveguide for THz pulse propagation," J. Opt. Soc. Am. B, Sep. 2009, pp. A6-A13, vol. 26, No. 9, Optical Society of America.

Mendis, Rajind, "Comment on 'low-loss terahertz ribbon waveguides'," Applied Optics, Aug. 10, 2008, pp. 4231-4234, vol. 47, No. 23, Optical Society of America.

Mendis, Rajind, et al., Comparison of the lowest-order transverse-electric (TE1) and transverse-magnetic (TEM) modes of the parallel-plate waveguide for terahertz pulse applications, Optics Express, Aug. 17, 2009, pp. 14839-14850, vol. 17, No. 17, Optical Society of America (OSA).

Mendis, R., "Guided-wave THz time-domain spectroscopy of highly doped silicon using parallel-plate waveguides," Electronics Letters, Jan. 5, 2006, 2 pages, vol. 42, No. 1, IEE.

Mendis, Rajind, "THz transmission characteristics of dielectric-filled parallel-plate waveguides," Journal of Applied Physics, 2007, pp. 083115-1 to 083115-4, vol. 101, American Institute of Physics.

Mendis, Rajind, et al., "Whispering-gallery-mode THz-pulse propagation on a single curved metallic plate," paper CThQ1, 2009, 2 pages, Optical Society of America, OSA/CLEO/IQEC 2009, IEEE.

Nagel, M., et al., Integrated THz technology for label-free genetic diagnostics, Applied Physics Letters, Jan. 7, 2002, pp. 154-156, vol. 80, No. 1, American Institute of Physics.

Nagel, M., et al., "THz biosensing devices: fundamentals and technology," Journal of Physics: Condensed Matter, 2006, pp. S601-S618, vol. 18, IOP (Institute of Physics) Publishing Ltd, United Kingdom.

O'Hara, John F., et al., "Thin-film sensing with planar terahertz metamaterials: sensitivity and limitations," Optics Express, Feb. 4, 2008, pp. 1786-1795, vol. 16, No. 3, Optical Society of America (OSA).

Patent application entitled "Resonant cavity integrated into a waveguide for terahertz sensing," by Rajind Mendis, et al., filed Sep. 17, 2009 as U.S. Appl. No. 12/561,978.

Prasad, Tushar, et al., "Superprism effect in a metal-clad terahertz photonic crystal slab," Optics Letters, Mar. 15, 2007, pp. 683-685, vol. 32, No. 6, Optical Society of America.

Slavík, Radan, et al., "Ultrahigh resolution long range surface plasmon-based sensor," Sensors and Actuators B, 2007, pp. 10-12, vol. 123, Elsevier B.V.

Sun, Yimin, et al., "Modulated terahertz responses of split ring resonators by nanometer thick liquid layers," Applied Physics Letters, 2008, pp. 221101-1 to 221101-3, vol. 92, American Institute of Physics.

Tiang, C. K., et al., "Electromagnetic simulation of terahertz frequency range filters for genetic sensing," Journal of Applied Physics, 2006, pp. 066105-1 to 066105-3, vol. 100, American Institue of Physics.

Verdeyen, Joseph T., "Laser Electronics," Third Edition, 1981, 2 pages, Prentice-Hall, Inc., Englewood Cliffs, New Jersey, USA.

Yee, Cristo M., et al., "High-Q terahertz microcavities in silicon photonic crystal slabs," Applied Physics Letters, 2009, pp. 154104-1 to 154104-3, vol. 94 American Institute of Physics.

Yoshida, H., et al., "Terahertz sensing method for protein detection using a thin metallic mesh," Applied Physics Letters, 2007, pp. 253901-1 to 253901-3, vol. 91, American Institute of Physics.

Zhao, Yuguang, et al., "2-D terahertz metallic photonic crystals in parallel-plate waveguides," IEEE Transactions on Microwave Theory and Techniques, Apr. 2007, pp. 656-663, vol. 55, No. 4, IEEE.

Zhang, Jiangquan, et al., "Waveguide terahertz time-domain spectroscopy of nanometer water layers," Optics Letters, Jul. 15, 2004, pp. 1617-1619, vol. 29, No. 14, Optical Society of America.

Awad, M. M., et al., "Transmission terahertz waveguide-based imaging below the diffraction limit," Applied Physics Letters, 2005, pp. 221107-1 to 221107-3, vol. 86, American Institute of Physics.

Balanis, Constantine A., "Advanced engineering electromagnetics," 1989, 1 page, John Wiley & Sons, Inc., USA.

Bowden, Bradley, et al., "Silver/polystyrene-coated hollow glass waveguides for the transmission of terahertz radiation," Optics Letters, Oct. 15, 2007, pp. 2945-2947, vol. 32, No. 20, Optical Society of America.

Coleman, S., et al., "A THz transverse electromagnetic mode two-dimensional interconnect layer incorporating quasi-optics," Applied Physics Letters, Nov. 3, 2003, pp. 3656-3658, vol. 83, No. 18, American Institute of Physics.

Gallot, G., et al., "Terahertz waveguides," J. Opt. Soc. Am. B, May 2000, pp. 851-863, vol. 17, No. 5, Optical Society of America.

Garmire, E., et al., "Flexible infrared-transmissive metal waveguides," Applied Physics Letters, Aug. 15, 1976, pp. 254-256, vol. 29, No. 4, American Institute of Physics.

Garmire, E., et al., "Low-loss optical transmission through bent hollow metal waveguides," Applied Physics Letters, Jul. 15, 1977, pp. 92-94, vol. 31, No. 2, American Institute of Physics.

Han, H., et al., "Terahertz pulse propagation in a plastic photonic crystal fiber," Applied Physics Letters, Apr. 15, 2002, pp. 2634-2636, vol. 80, No. 15, American Institute of Physics.

Hecht, Jeff, "Understanding fiber optics," Fifth Edition, 2006, 1 cover page and 1 publishing page, copyright by Jeff Hecht and published by Pearson Education, Inc., Upper Saddle River, New Jersey.

Jamison, S. P., et al., "Single-mode waveguide propagation and reshaping of sub-ps terahertz pulses in sapphire fibers," Applied Physics Letters, Apr. 10, 2000, pp. 1987-1989, vol. 76, No. 15, American Institute of Physics.

Jeon, Tae-In, et al., "Direct optoelectronic generation and detection of sub-ps-electrical pulses on sub-mm-coaxial transmission lines," Applied Physics Letters, Dec. 20, 2004, pp. 6092-6094, vol. 85, No. 25, American Institute of Physics.

Jian, Zhongping, et al., "Defect modes in photonic crystal slabs studied using terahertz time-domain spectroscopy," Optics Letters, Sep. 1, 2004, pp. 2067-2069, vol. 29, No. 17, Optical Society of America.

Marcuvitz, N., Editor, "Waveguide handbook," First Edition, 1951, 1 cover page and 1 publishing page, The McGraw-Hill Book Company, Inc., USA.

Melinger, Joseph S., et al., "High-resolution waveguide terahertz spectroscopy of partially oriented organic polycrystalline films," J. Phys. Chem. A, 2007, pp. 10977-10987, vol. 111, No. 43, American Chemical Society.

Mendis, R., et al., "Plastic ribbon THz waveguides," Journal of Applied Physics, Oct. 1, 2000, pp. 4449-4451, vol. 88, No. 7, American Institute of Physics.

Mendis, R., et al., "THz interconnect with low-loss and low-group velocity dispersion," IEEE Microwave and Wireless Components Letters, Nov. 2001, pp. 444-446, vol. 11, No. 11, IEEE.

Mendis, R., et al., "Undistorted guided-wave propagation of subpicosecond terahertz pulses," Optics Letters, Jun. 1, 2001, pp. 846-848, vol. 26, No. 11, Optical Society of America.

Mizushima, Y., et al., "Ultralow loss waveguide for long distance transmission," Oct. 1, 1980, pp. 3259-3260, vol. 19, No. 19, Applied Optics.

Nagel, M., et al., "Modular parallel-plate THz components for cost-efficient biosensing systems," Semiconductor Science and Technology, 2005, pp. S281-S285, vol. 20, Institute of Physics (IOP) Publishing Ltd, United Kingdom.

Nishihara, H., et al., "Low-loss parallel-plate waveguide at 10.6 µm," Applied Physics Letters, Oct. 1, 1974, pp. 391-393, vol. 25, No. 7, American Institute of Physics.

Provisional patent application entitled "Ultra low loss waveguide for broadband terahertz radiation," by Rajind Mendis, et al., filed May 2, 2008 as U.S. Appl. No. 61/049,887.

Wächter, Markus, et al., "Metallic slit waveguide for dispersion-free low-loss terahertz signal transmission," Applied Physics Letters, 2007, pp. 061111-1 to 061111-3, vol. 90, American Institute of Physics.

Wang, Kanglin, et al., "Guided propagation of terahertz pulses on metal wires," J. Opt. Soc. Am. B, Sep. 2005, pp. 2001-2008, vol. 22, No. 9, Optical Society of America.

Wang, Kanglin, et al., "Metal wires for terahertz wave guiding," Nature, www.nature.com/nature, Nov. 18, 2004, pp. 376-379, vol. 432, Nature Publishing Group.

* cited by examiner

ULTRA LOW LOSS WAVEGUIDE FOR BROADBAND TERAHERTZ RADIATION

CROSS-REFERENCE TO RELATED APPLICATIONS

The present application claims priority to U.S. Provisional Patent Application 61/049,887 filed May 2, 2008 by Rajind Mendis, et al. and entitled "Ultra Low Loss Waveguide for Broadband Terahertz Radiation," which is incorporated herein by reference as if reproduced in its entirety.

STATEMENT REGARDING FEDERALLY SPONSORED RESEARCH OR DEVELOPMENT

This invention was made with government support under Grant Numbers EECS-0724996 and CHE-0520605 awarded by the National Science Foundation, and under Grant Number FA8650-07-2-5061 awarded by the Air Force Office of Scientific Research. The government has certain rights in the invention.

REFERENCE TO A MICROFICHE APPENDIX

Not applicable.

BACKGROUND

Electromagnetic radiation at Terahertz (THz) frequencies and sub-millimeter wavelengths are being investigated for various applications, such as, low-loss interconnects, sub-wavelength imaging, and high sensitivity spectroscopy and biosensing. One of the challenges for the success of THz technologies is transporting the waves at THz frequencies over sufficiently long distances, e.g., many orders of magnitude greater than the sub-millimeter wavelengths. Various waveguides have been examined to transport the waves with little promise due to substantial wave attenuation and dispersion that causes signal loss and distortion. The observed wave attenuation for such waveguides is not suitable for sensing and communications systems, for instance, in comparison to optical fiber waveguides that are typically used in telecommunications to transport optical waves with shorter wavelengths.

One examined waveguide that has relatively lower attenuation at THz frequencies is the parallel plate waveguide (PPWG), which comprises two parallel plates. The PPWG has no low frequency cutoff for THz waves corresponding to a transverse electric and magnetic (TEM) mode and therefore can transport the TEM mode with little or no wave dispersion. However, the PPWG attenuation for the TEM mode may increase as the wave frequencies increase, which causes signal losses and makes it unsuitable for broadband applications. For modes other than the TEM mode, the PPWG may have THz cutoff frequencies that cause significant wave dispersion and hence pulse distortion. The distortion for a mode can be reduced if its cutoff frequency is decreased, for instance, by further separating the two parallel plates of the PPWG from one another. However, increasing the distance between the parallel plates also allows additional modes to propagate, which have higher cutoffs and hence introduce additional dispersion.

SUMMARY

In one embodiment, the disclosure includes an apparatus comprising a PPWG comprising two plates separated by a distance that supports a multimode wave, and a transmitter configured to emit a wave having a frequency from about one hundred Gigahertz (GHz) to about ten THz and to couple to one mode of the PPWG.

In another embodiment, the disclosure includes an apparatus comprising two plates substantially parallel to one another and separated by at least about five millimeters (mm), and an antenna coupled to the two plates and configured to transmit or receive a wave having a frequency from about one hundred GHz to about ten THz.

In yet another embodiment, the disclosure includes a method comprising polarizing an electromagnetic beam in the first transverse electric mode with respect to a PPWG comprising two plates, adjusting the diameter of the electromagnetic beam based on the separation between the plates, and sending the electromagnetic beam into the PPWG.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for transporting waves at THz frequencies without substantial attenuation or dispersion using a PPWG. Specifically, a wave beam may be coupled to the PPWG, where a first transverse electric ($TE_1$) mode may be propagated. For the $TE_1$ mode, the PPWG attenuation may decrease as the wave frequencies increase above its cutoff frequency. Hence, to reduce the attenuation at frequencies above the cutoff frequency, the distance between the two plates of the PPWG may be increased. Increasing the separation between the two plates may also reduce the dispersion for the $TE_1$ mode. Further, to prevent or limit additional modes and additional dispersion due to increasing the separation between the two plates, the coupling efficiency for the $TE_1$ may be improved without exciting the other modes by adjusting the wave beam diameter according to the distance between the two plates.

Figure 1:
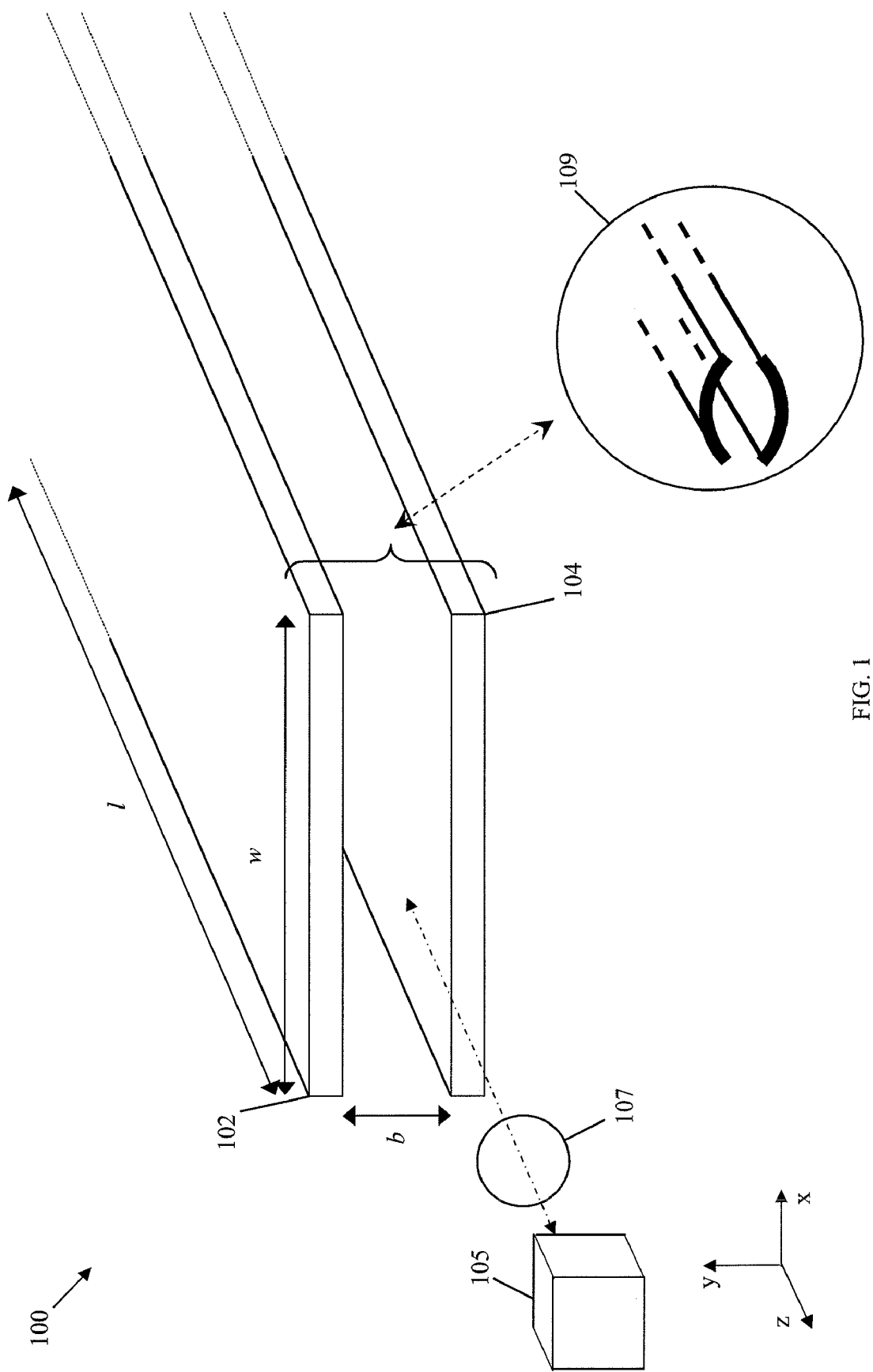
FIG. 1 is a perspective view of an embodiment of a PPWG.

FIG. 1 illustrates one embodiment of a PPWG 100, which may transport waves at THz frequencies. The PPWG 100 may comprise two plates 102, which may be substantially parallel. The plates 102 and 104 may be made from electrical conducting material for THz frequencies, such as metal. The two plates 102 and 104 may be separated from one another by a separation distance b, which may be greater than or equal to about one mm, about three mm, or about five mm, and comprise air or any other gas. The plates 102 and 104 may have a width w and a length l, which may be larger than the separation distance b. For instance, the length l may be on the order of millimeters or centimeters, such as for applications including low-loss interconnects, sub-wavelength imaging, spectroscopy, biosensing, etc., or may be on the order of meters, such as in telecommunications.

In an embodiment, the PPWG 100 may be coupled to a transmitter or antenna 105, which may be used to transmit a wave beam at a single or a plurality of THz frequencies, for instance from about one hundred GHz to about ten THz. The transmitter or antenna 105 may also polarize the wave with respect to the direction of the plates 102 and 104, where the wave may comprise an electric field aligned in a direction with respect to the width w. In some embodiments, a lens 107, such as a silicon plano-cylindrical lens, may be coupled to the transmitter or antenna 105 and the two plates 102 and 104. The lens 107 may be configured to focus the wave beam from the transmitter or antenna 105 and couple the wave beam to the PPWG 100. For instance, the lens 107 may adjust a diameter of the wave beam with respect to the separation distance b. Additionally or alternatively, the PPWG 100 may be coupled to a receiver (e.g., an antenna), which may be used to receive a wave at a single or a plurality of frequencies from the PPWG 100.

In some embodiments, the plates 102 and 104 may each have a curvature that is concave with respect to the other plate to transport the waves with less attenuation. A sectional profile 109 shows an embodiment of the plates that may have curvatures and may be concave with respect to each other. Further, the plates 102 and 104 may be curved at least at one portion along the length of the PPWG 100. As such, the plates 102 and 104 may redirect the transported waves along the trajectory from the transmitter or antenna 105 to the receiver. For instance, the plates 102 and 104 may be curved to redirect the propagating waves at about 180 degrees and may have a curve radius equal to about seven centimeters.

Figure 2:
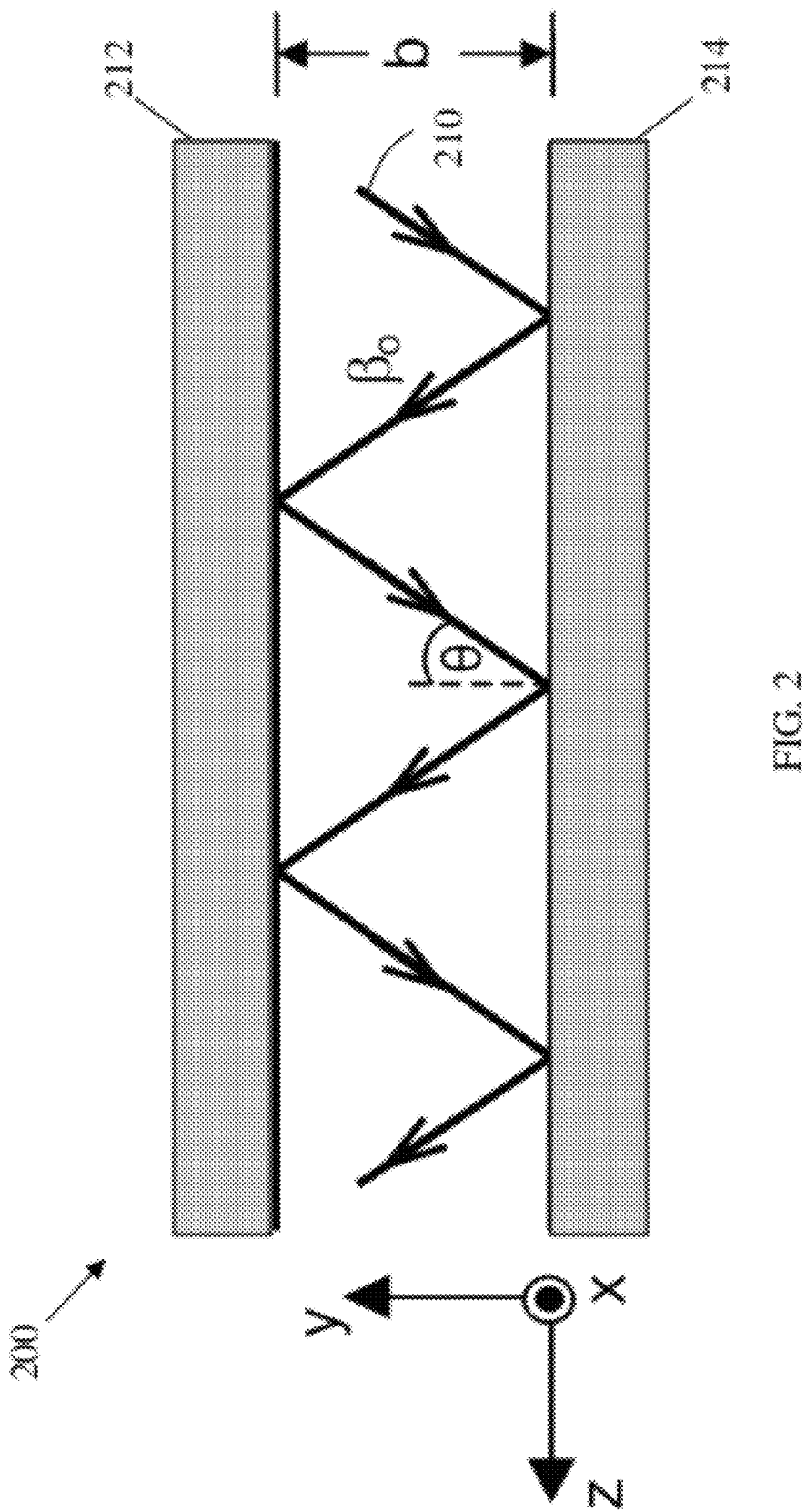
FIG. 2 is a section view of an embodiment of the PPWG wave propagation.

FIG. 2 illustrates a PPWG wave propagation 200, where a wave 210 may be transmitted and polarized in a transverse electric (TE) direction. Accordingly, the wave 210 may comprise an electric field in the direction parallel to the PPWG's plates 212 and 214, e.g., in the x direction, and may propagate along the length of the plates 202 and 204, e.g., in the z direction. In an embodiment, at least one $n^{th}$ order TE ($TE_n$) mode may propagate in the PPWG, where n=1, 2, 3 .... Specifically, a $TE_n$ mode may propagate at a frequency above its cutoff frequency and may not propagate at a frequency below its cutoff frequency, which may be determined according to the separation distance b. A two-dimensional analytical model may be used to analyze the field components of a wave corresponding to a $TE_n$ mode. For instance, based on the model described in "Waveguide Handbook" by N. Marcuvitz and published by McGraw-Hill 1951, which is incorporated herein by reference as if reproduced in its entirety, the $TE_n$ mode may comprise the following field components:

$$E_x = \frac{A_n \beta_y}{\varepsilon_o} \sin(\beta_y y) e^{-j\beta_z z} \qquad (1)$$

$$H_y = \frac{A_n \beta_y \beta_z}{\omega \mu_o \varepsilon_o} \sin(\beta_y y) e^{-j\beta_z z}, \text{ and} \qquad (2)$$

$$H_z = -\frac{j A_n \beta_y^2}{\omega \mu_o \varepsilon_o} \cos(\beta_y y) e^{-j\beta_z z}, \qquad (3)$$

where the subscripts x, y, and z indicate the spatial directions shown in FIG. 2. In equations 1, 2, and 3, $E_x$ is an electric field component in the x direction parallel to the width of the plates 202 and 204, $H_y$ is a magnetic field component in the y direction parallel to the separation distance b between the plates 202 and 204, and $H_z$ is a magnetic field component in the z direction parallel to the length of the plates 202 and 204. Further, $\beta_y$ is the field phase in the y direction and is equal to $n\pi/b$, $\beta_z$ is the field phase in the z direction, $A_n$ is a constant that depends on the input excitation of the PPWG, $\varepsilon_o$ and $\mu_o$ are the permittivity and permeability of free space, respectively, $\omega$ is an angular frequency equal to $2\pi f$, where $f$ is the wave frequency, and j indicates an imaginary number.

According to the analytical model, the electric field component $E_x$ above may have a mathematical solution in the following form:

$$E_x, H_y, H_z \propto (e^{-j\beta_y y} \mp e^{+j\beta_y y}) e^{-j\beta_z z}. \qquad (4)$$

The two exponential functions on the right side of equation 4 indicate that $E_x$ may comprise two plane waves, which may propagate in the y-z direction. The two plane waves may also bounce back and forth between the plates 202 and 204 while propagating in the y-z direction. The two plane waves may be s-polarized, e.g., may oscillate in the x direction parallel to the width of the plates 202 and 204 and perpendicular to the length of the plates 202 and 204.

Additionally, each plane wave may have a phase constant $\beta_o$, where $\beta_o = \sqrt{\beta_y^2 + \beta_z^2} = 2\pi/\lambda_o$, and where $\lambda_o$ is the field wavelength in free space. The y-component of the phase constant may be represented as $\beta_y = \beta_o \cos \theta$, where $\theta$ is an incident angle of the wave 210 in the PPWG with respect to the y direction. The incident angle may be represented as:

$$\theta = \cos^{-1}\left(\frac{\beta_y}{\beta_o}\right) = \cos^{-1}\left(\frac{n\lambda_o}{2b}\right). \qquad (5)$$

According to equation 5, the cutoff condition of the $TE_n$ mode may be defined by $n\lambda_o/(2b) \leq 1$, where the incident angle $\theta$ may vary between zero and ninety degrees. As such, the cutoff frequency may be defined as $f_c = nc/(2b)$, where c is the speed of light in free space. Equation 5 shows that as the field wavelength $\lambda_o$ increases, e.g., as the frequency decreases, the incident angle may approach zero and the cutoff condition may be reached. Conversely, when the frequency increases, the incident angle may approach 90 degrees, where the wave 210 may propagate at grazing incidence in the PPWG, e.g., in the z direction. Further, as the order n of the $TE_n$ mode increases, the cutoff frequency $f_c$ may increase and the incident angle in the PPWG may decrease at any frequency above $f_c$. On the other hand, increasing the separation distance b between the plates 202 and 204 may reduce the cutoff frequency $f_c$ of a $TE_n$ mode.

Figure 3:
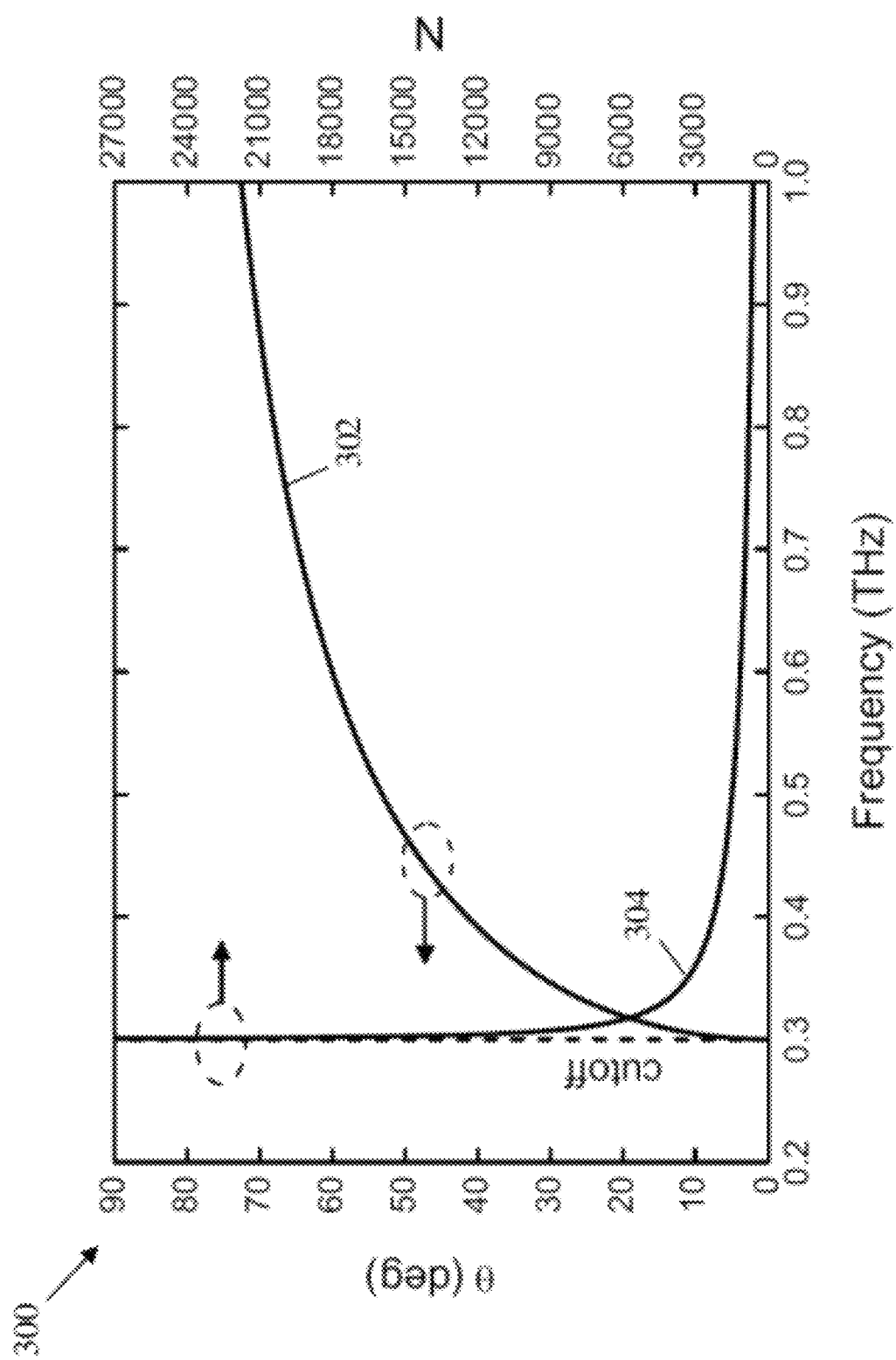
FIG. 3 is a chart of an embodiment of a frequency dependence curve plot.

FIG. 3 illustrates a frequency dependence curve plot 300 for a first order TE ($TE_1$) mode in the PPWG, which shows the frequency dependence of the angle θ and the number of bounces N. The frequency dependence curve plot 300 may comprise a first frequency dependence curve 302 and a second frequency dependence curve 304 that are obtained using the analytical model above, where the PPWG's plates are aluminum plates and b is equal to about 0.5 mm. The first frequency dependence curve 302 indicates an increase in the incident angle θ in the PPWG as the frequency of the $TE_1$ mode increases. For instance, the incident angle θ may increase from about zero at the cutoff frequency $f_c$ of the $TE_1$ mode, which may be about 0.3 THz, to about 70 degrees at about 1 THz.

As the incident angle θ varies with frequency, the number of bounces N along the length of the plates in the PPWG, e.g., wave reflections from the inside walls of the plates, may also vary with frequency. By dividing the length of the plates by the distance for one bounce along the PPWG, an inverse relation between θ and N is found, such as:

$$N = \frac{1}{b}\cot(\theta). \qquad (6)$$

Hence, since θ increases as the frequency increases, the number of bounces N may decrease as the frequency of the $TE_1$ mode increases, which is indicated in the second frequency dependence curve 304. For instance, the number of bounces N may decrease from near infinity at the cutoff frequency to about one bounce at about 1 THz. An infinite number of bounces may indicate no propagation of the wave along the length of the PPWG, e.g., the wave substantially bounces vertically between the plates and not along the plates, while zero bounces may indicate the wave propagation at grazing incidence. Similar to the $TE_1$ mode, the incident angle for other higher $TE_n$ modes in the PPWG may increase and the number of bounces may decrease as the wave frequency increases from the corresponding cutoff frequencies.

Figure 4:
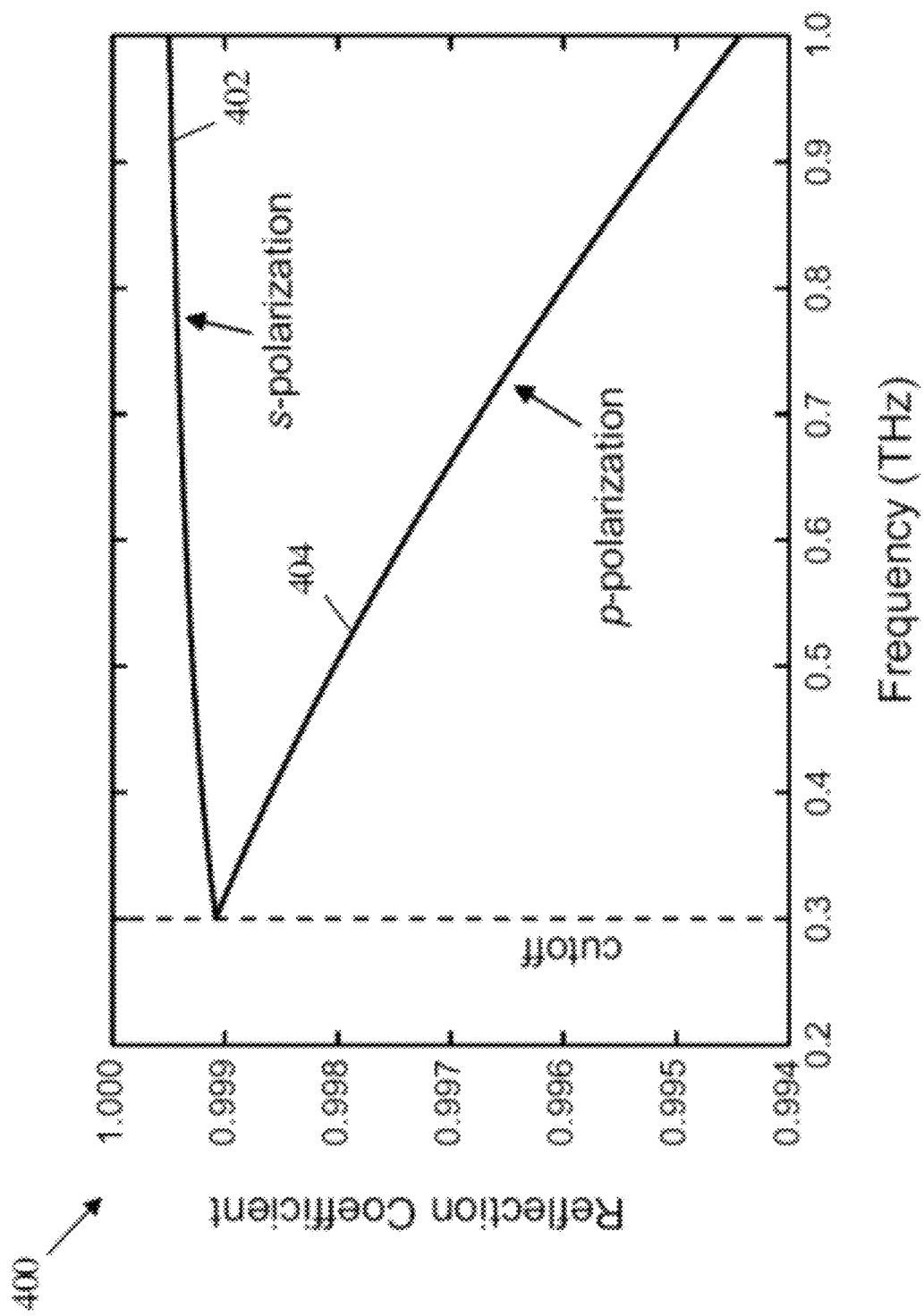
FIG. 4 is a chart of an embodiment of a reflection coefficient curve plot.

FIG. 4 illustrates a reflection coefficient curve plot 400 for the $TE_1$ mode in the PPWG. The reflection coefficient curve plot 400 may comprise a first reflection coefficient curve 402 and a second reflection coefficient curve 404. The first reflection coefficient curve 402 represents the relation between the frequency of the s-polarized $TE_1$ mode and its reflection coefficient $r_s$, which is the ratio of reflected wave amplitude to incident wave amplitude at one bounce or reflection in the PPWG of FIG. 3. In FIG. 4, the values of the first reflection coefficient curve 402 also correspond to the values of the incident angle θ in the first frequency dependence curve 302 as the frequency of the $TE_1$ mode increases. The $r_s$ values may be obtained using the following expression:

$$r_s = \frac{Z_2\cos(\theta) - Z_1\cos(\theta_t)}{Z_2\cos(\theta) + Z_1\cos(\theta_t)}, \qquad (7)$$

where $Z_1$ and $Z_2$ are the intrinsic impedances of air and metal (e.g., aluminum) on the incidence and transmission sides, respectively, of the plate internal wall boundary, and $\theta_t$ is the angle of transmission on the transmission side of the plate internal wall boundary. Generally, $Z_1$ and $Z_2$ may be equal to $\sqrt{j\omega\mu/(\sigma+j\omega\epsilon)}$, where ω, μ, σ, and ε are the angular frequency, permeability, conductivity, and permittivity, respectively, of the material on the corresponding side of the plate internal wall boundary. When the plate comprises a high conductivity metal, such as aluminum, $\theta_t$ may be equal to about zero and the ratio of $Z_1$ to $Z_2$ may be approximated, such as:

$$\frac{Z_1}{Z_2} \approx \sqrt{\frac{\sigma}{j\omega\varepsilon_o}}, \qquad (8)$$

where σ may be assumed constant along the frequency range of interest, e.g., from about 0.2 THz to about one THz. The values for $r_s$ may be calculated by substituting in equation 7 the ratio of $Z_1$ to $Z_2$ from equation 8 and the values of θ from equation 5. The first reflection coefficient curve 402 indicates an increase in the reflection coefficient $r_s$ as the frequency of the s-polarized $TE_1$ mode increases from the cutoff frequency ($f_c$=0.3 THz).

On the other hand, the second reflection coefficient curve 404 represents the relation between the frequency of a p-polarized first order transverse magnetic ($TM_1$) mode and its reflection coefficient $r_p$. The $TM_1$ mode may comprise an electric field component parallel to the separation distance b between the PPWG's plates and not to the width of the plates. The second reflection coefficient curve 404 indicates a decrease in the reflection coefficient $r_p$ as the frequency of the p-polarized wave increases from the cutoff frequency. Further, the frequency dependence of $r_p$ is greater than the frequency dependence of $r_s$.

Figure 5:
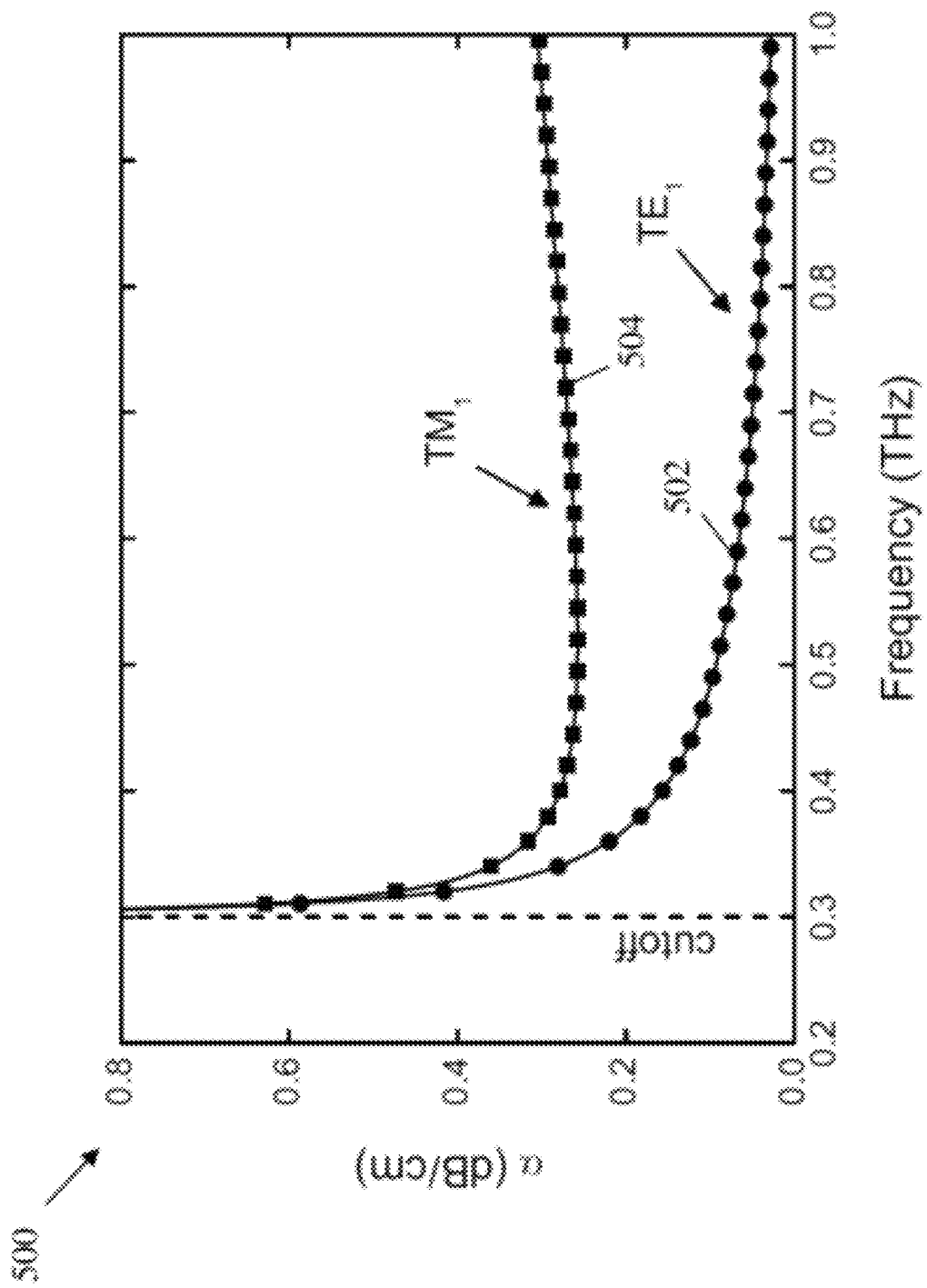
FIG. 5 is a chart of an embodiment of an attenuation constant curve plot.

FIG. 5 illustrates an attenuation constant curve plot 500 for the $TE_1$ mode and the $TM_1$ mode in the PPWG. The attenuation constant curve plot 500 may comprise a first attenuation constant curve 502 and a second attenuation constant curve 504. The first attenuation constant curve 502 represents the relation between the frequency of the $TE_1$ mode and its attenuation constant α. The attenuation constant α of the $TE_1$ mode may be obtained using the values of $r_s$ in the first reflection coefficient curve 402 and the number of bounces N at the corresponding incident angles θ, such as:

$$\alpha = N(1-|r_s|^2). \qquad (9)$$

The first attenuation constant curve 502 indicates a continuous decrease in the attenuation constant α as the frequency of the $TE_1$ mode increases from the cutoff frequency.

The second attenuation constant curve 504 represents the relation between the frequency of the $TM_1$ mode and its attenuation constant α. The attenuation constant α of the $TM_1$ mode may be obtained using the values of $r_p$ in the first reflection coefficient curve 402 and, such as $\alpha = N(1-|r_p|^2)$. Unlike the case of the $TE_1$ mode, the second attenuation constant curve 504 indicates a relatively sharp decrease from the cutoff frequency to a minimum (at about 0.5 THz) and then a continuous increase in the attenuation constant beyond that point.

Figure 6:
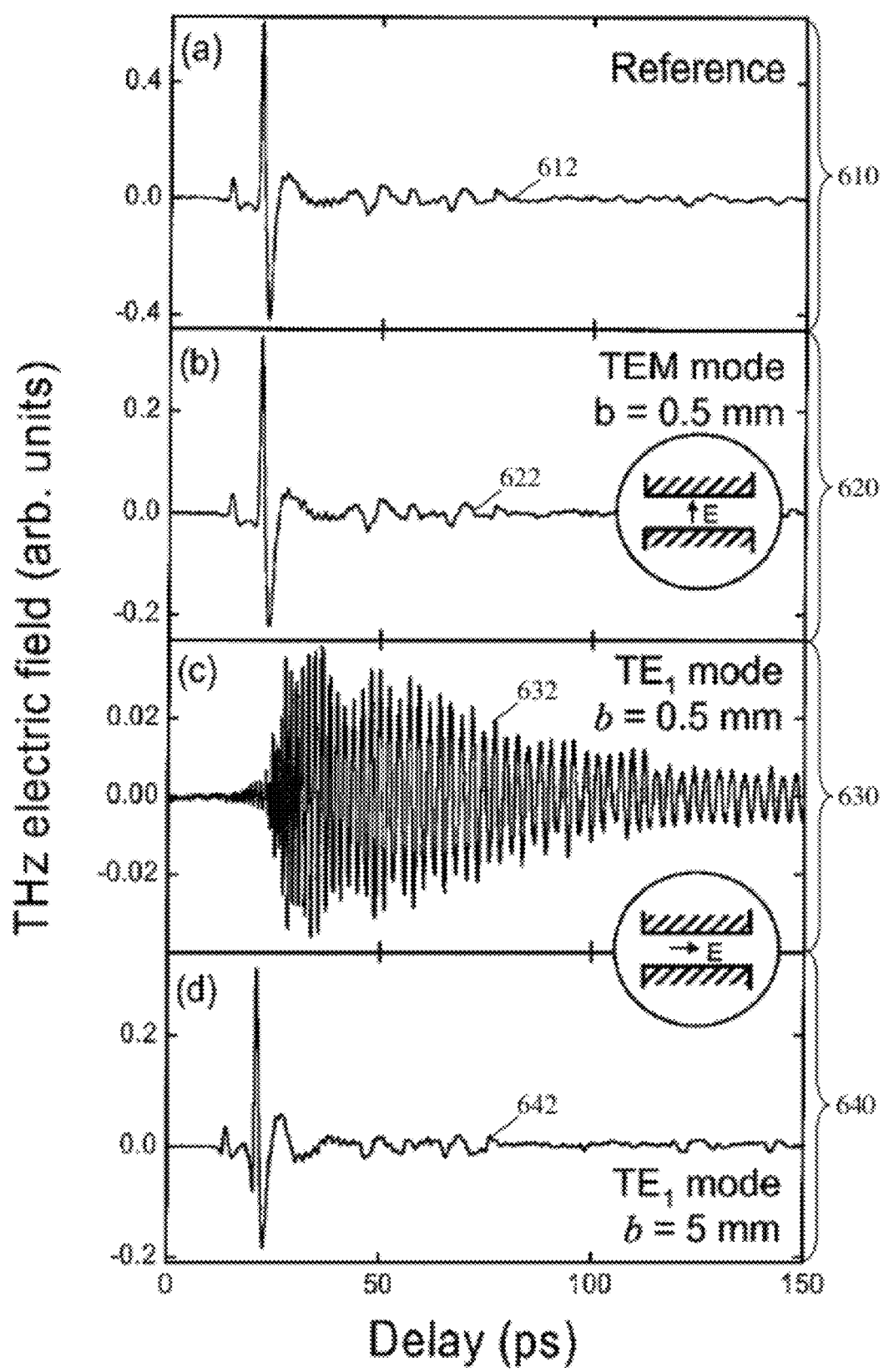
FIG. 6 is a chart of an embodiment of a plurality of time pulses.

FIG. 6 illustrates a plurality of plots 610, 620, 630, and 640, which comprise a plurality of time pulses for different wave modes in a PPWG. Plot 610 shows a time pulse 612, for a wave beam that is transmitted at THz frequencies using a first photoconductive antenna coupled to a receiver via two plano-cylindrical lenses, and may be representative of the signal coupled to the PPWG. The wave beam is focused and coupled to the PPWG by a plano-cylindrical lens. Specifically, the wave beam has a diameter equal to about 10 mm, and the PPWG comprises two substantially parallel aluminum plates, which are separated by about 0.5 mm.

The wave beam is polarized perpendicular to the PPWG's plates and coupled to the PPWG to excite or propagate the TEM mode in the PPWG. Plot 620 shows a time pulse 622 corresponding to the TEM mode that is detected after propagating a distance equal to about 25.4 mm in the PPWG. The time pulse 622 is detected using a second photoconductive antenna coupled to the output of PPWG. The detected time pulse 622 is substantially similar to the transmitted time pulse 612, which may indicate that the TEM mode propagates in the PPWG with no dispersion along the examined distance. Further, the amplitude of the time pulse 622 is smaller than the amplitude of the time pulse 612, which may indicate some attenuation for the TEM mode.

The wave beam is also polarized parallel to the PPWG's plates to excite the $TE_1$ mode in the PPWG. Plot 630 shows a time pulse 632 corresponding to the $TE_1$ mode that is detected for the same propagation distance as the time pulse 622. Unlike the detected time pulse 622, the time pulse 632 is substantially different than the transmitted time pulse 612 and has substantially smaller amplitude, which may indicate stronger attenuation for the $TE_1$ mode. Further, the time pulse 632 is substantially broadened, reshaped, and comprises positive chirps, which may be due to strong dispersion. The strong attenuation and dispersion of the $TE_1$ mode may be related to the cutoff frequency of the $TE_1$ mode, which is equal to about 0.3 THz as described in more detail below. The next higher order TE mode that may be excited in the PPWG is the third TE ($TE_3$) mode, which may have a cutoff frequency equal to about 0.9 THz close to the end of the transmitted and detected frequency range. Therefore, at this frequency range, no higher order TE modes may propagate with about 0.5 mm separation between the plates in the PPWG, also referred to as single mode propagation.

The separation distance between the PPWG's plates is then increased from about 0.5 mm to about five mm to decrease the cutoff frequency of the $TE_1$ mode from about 0.3 THz to about 30 GHz. Plot 640 shows a time pulse 642 corresponding to the $TE_1$ mode with reduced cutoff frequency, which is detected after propagating the same distance as the time pulse 622. Similar to the detected time pulse 622, the detected time pulse 642 is substantially similar to the transmitted time pulse 612, and also has about the same amplitude as the time pulse 622. Accordingly, after increasing the separation distance between the plates and reducing the cutoff frequency of the $TE_1$ mode, the $TE_1$ mode may have about the same dispersion and attenuation as the TEM mode.

Figure 7:
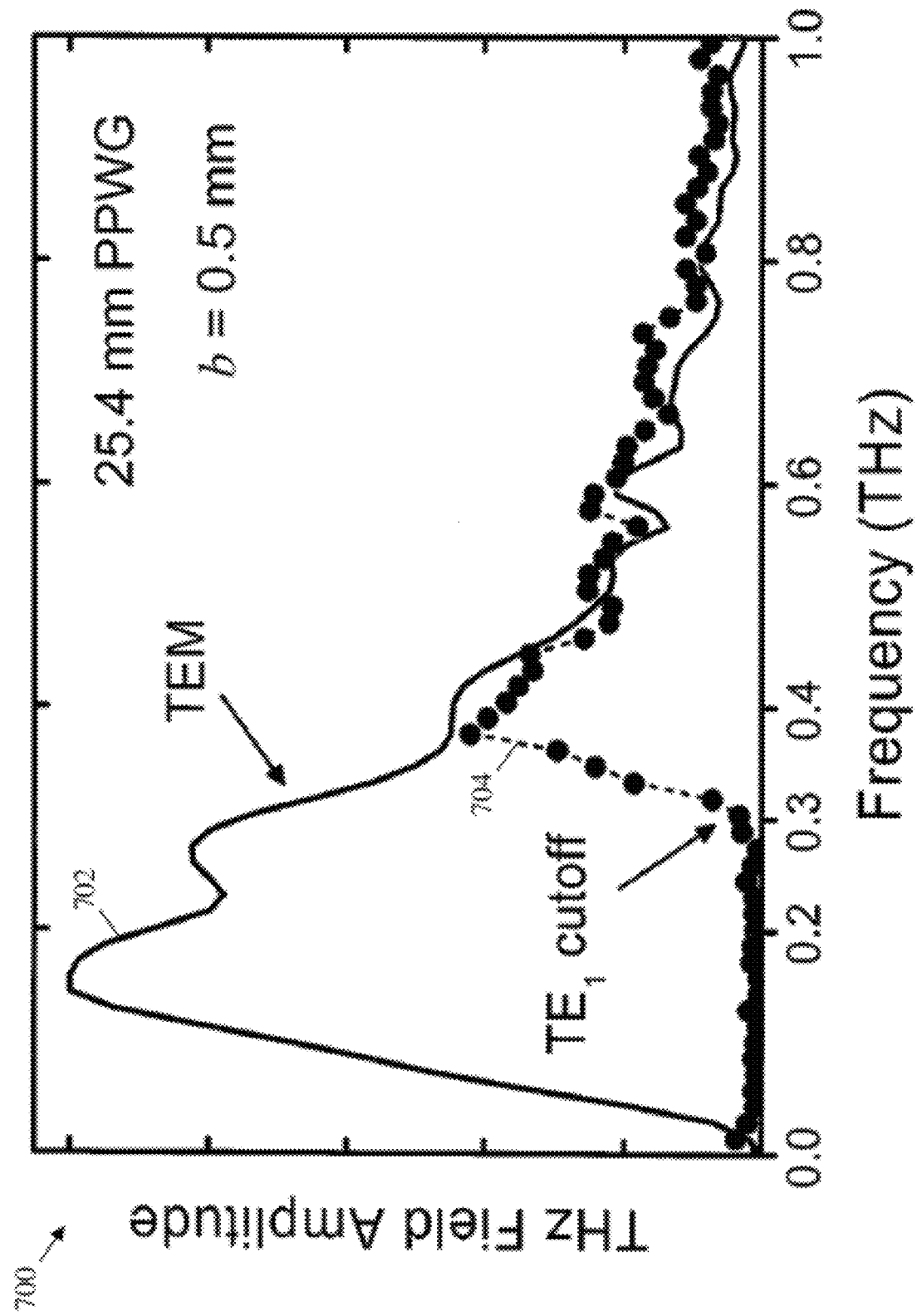
FIG. 7 is a chart of an embodiment of a wave amplitude curve plot.

FIG. 7 illustrates a wave amplitude curve plot 700 for the detected TEM mode and the $TE_1$ mode of FIG. 6. FIG. 7 comprises a first wave amplitude curve 702 and a second wave amplitude curve 704 that represent the detected wave amplitudes for the TEM mode and $TE_1$ mode, respectively, at a plurality of THz frequencies, e.g., from about zero to one THz. Specifically, the wave amplitudes are detected for the TEM mode and the $TE_1$ mode, where the PPWG's plates are separated by about 0.5 mm and the $TE_1$ mode has a cutoff frequency equal to about 0.3 THz. At the frequencies below the cutoff frequency of the $TE_1$ mode, the first wave amplitude curve 702 and the second wave amplitude curve 704 show that the wave amplitudes for the TEM mode are substantially higher than the wave amplitudes of the $TE_1$ (equal to about zero). However, at the frequencies above the cutoff frequency of the $TE_1$ mode, the wave amplitudes for the TEM mode and the $TE_1$ mode are close. The substantial difference in the wave amplitudes curves for TEM mode and $TE_1$ mode may explain the difference in the detected time pulse 622 and time pulse 632. For instance, the substantial broadening, reshaping, and positive chirps of the time pulse 632 may be attributed to the cutoff frequency of the $TE_1$ mode.

Figure 8:
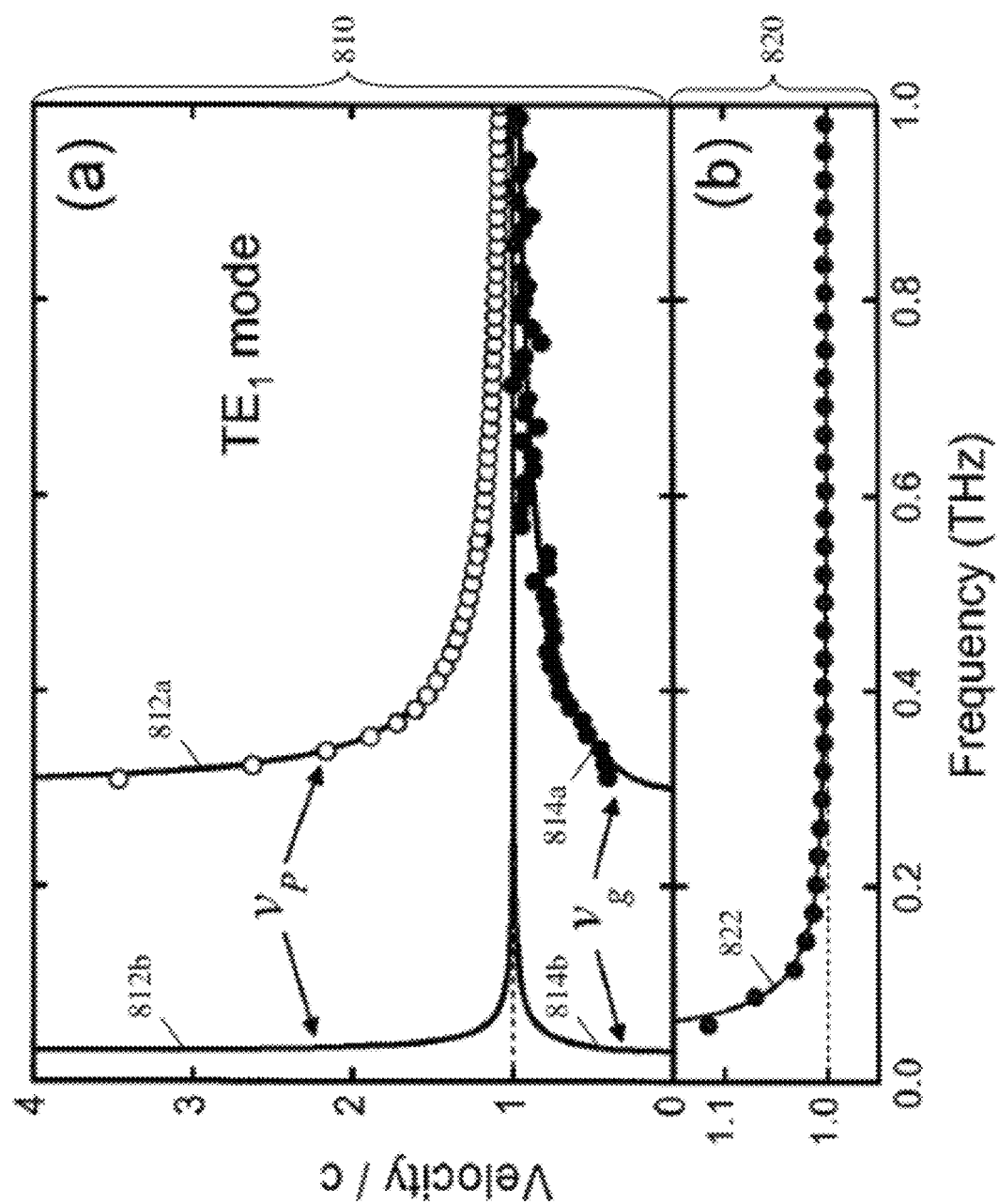
FIG. 8 is a chart of an embodiment of a plurality of velocity curves.

FIG. 8 illustrates a plot 810 and a plot 820, which comprise a plurality of velocity curves for the $TE_1$ mode of FIG. 6. In FIG. 8, plot 810 comprises a first velocity curve 812a and a second velocity curve 812b that each illustrates theoretical phase velocity $v_p$ values (solid lines) and experimental phase velocity $v_p$ values (hollow circles) at a plurality of THz frequencies (from about zero to one THz). Plot 820 also comprises a curve 822, which is a zoom-in view of the second velocity curve 812b. Specifically, the first velocity curve 812a is obtained for the $TE_1$ mode with about 0.3 THz cutoff frequency and about 0.5 mm separation distance between plates, and the second velocity curve 812b is obtained for the $TE_1$ mode with about 30 GHz cutoff frequency and about five mm separation distance between plates. The experimental values are obtained by first measuring the wave amplitudes for a plurality of PPWGs with different lengths (different propagation distances) and calculating a phase constant β at each frequency, which is then used to calculate phase velocity $v_p$ values at different frequencies or angular frequencies ω, such as $v_p = \omega/\beta$. The theoretical values are obtained using a guided-wave theory described by N. Marcuvitz and/or described in "Advanced Engineering Electromagnetics" by C. A. Balanis and published by John Wiley & Sons, New York, 1989, which is incorporated herein by reference as if reproduced in its entirety. The first velocity curve 812a may indicate a highly dispersive nature of the $TE_1$ mode, where the phase velocity of the wave drops sharply after the cutoff frequency.

Additionally, plot 810 comprises a third velocity curve 814a and a fourth velocity curve 814b that each illustrates theoretical group velocity $v_g$ values (solid lines) and experimental phase velocity $v_g$ values (solid circles) at the THz frequencies. The third velocity curve 814a and the fourth velocity curve 814b is also obtained for the $TE_1$ mode with about 0.3 THz cutoff frequency and about 30 GHz cutoff frequency, respectively. The experimental values are obtained using the calculated phase constants β such as $v_g = \partial \omega/\partial \beta$ and the theoretical values are obtained using the guided-wave theory. The third velocity curve 814a may also indicate a highly dispersive nature of the $TE_1$ mode, where the group velocity of the wave varies sharply near the cutoff frequency. However, at the reduced cutoff frequency (at about 30 GHz), the group velocity and the phase velocity are about constant over a substantial portion of the frequency range and only a small portion of the range at the smaller frequencies is affected by the frequency cutoff.

Figure 9:
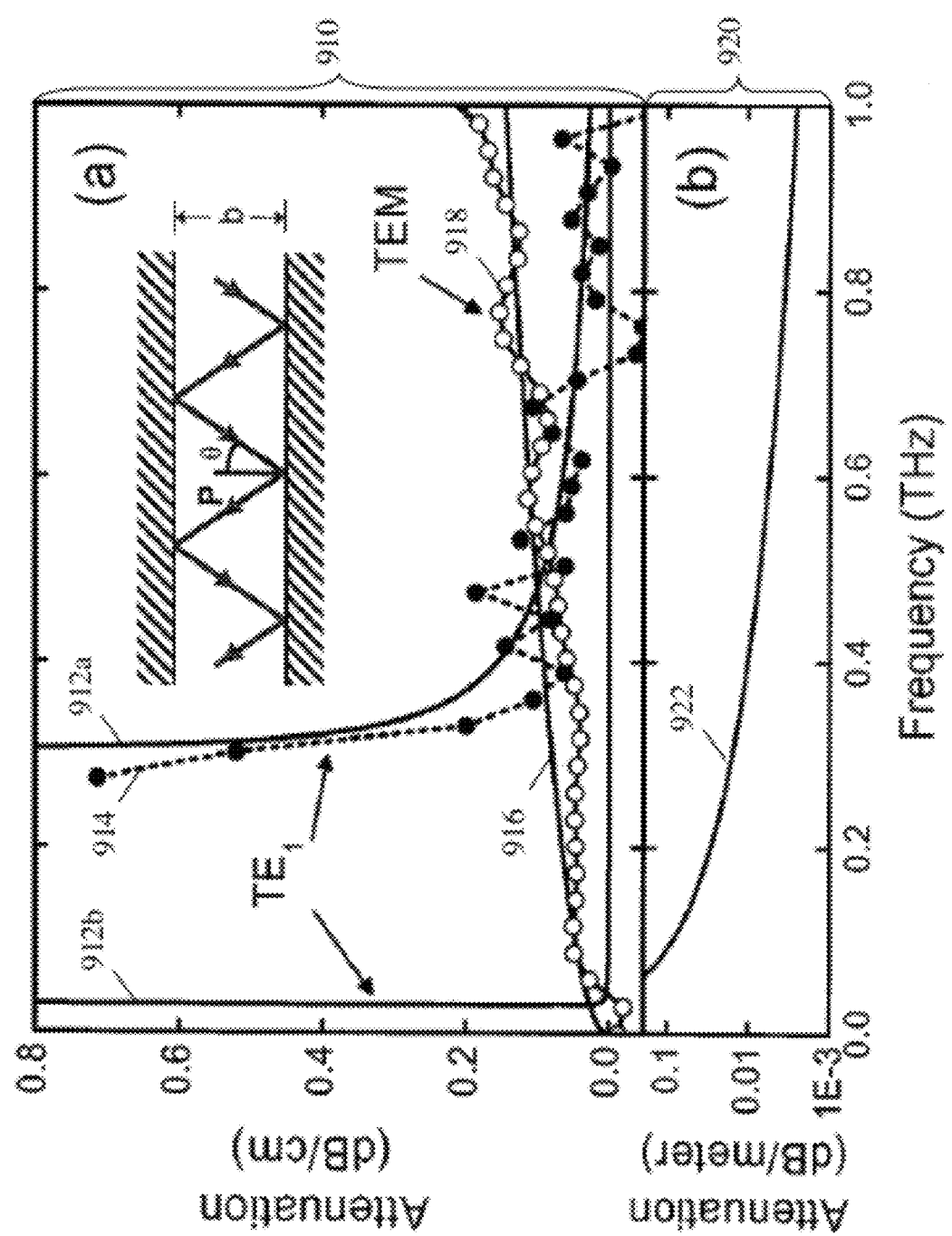
FIG. 9 is a chart of an embodiment of a plurality of attenuation curves.

FIG. 9 illustrates a plot 910 and a plot 920, which comprise a plurality of attenuation curves for the TEM mode and $TE_1$ mode of FIG. 6. In FIG. 9, plot 910 comprises a first attenuation curve 912a and a second attenuation curve 912b that illustrate theoretical attenuation $\alpha_{TE}$ values (solid lines) in decibel per centimeter (dB/cm) obtained for the $TE_1$ mode with about 0.3 THz cutoff frequency and about 30 GHz cutoff frequency, respectively. The theoretical values are obtained using the relation $$\alpha_{TE} = \frac{4R_s(f_c/f)^2}{Z_0 b\sqrt{1-(f_c/f)^2}},$$

where $Z_0$ is the impedance of free space, and $R_s$ is the surface resistance of the plates and may be equal to $\sqrt{\pi f \mu/\sigma}$. Plot 910 comprises a third attenuation curve 914 that illustrates experimental attenuation $\alpha_{TE}$ values (solid circles) obtained for the $TE_1$ mode with about 0.3 THz cutoff frequency.

The first attenuation curve 912a, the second attenuation curve 912b, and the third attenuation curve 914 indicate strong attenuation of the $TE_1$ mode at the cutoff frequency and below the cutoff frequency, where $\alpha_{TE}$ increases sharply and substantially as the frequency decreases. However, the attenuation decreases slowly as the frequency increases beyond the cutoff frequency. At the smaller cutoff frequency of the second attenuation curve 912b, the attenuation is relatively low and decreases slowly over a substantial portion of the frequency range. Plot 920 also comprises a curve 922, which is a zoom-in view of the second attenuation curve 912b and shows clearly the decrease in $\alpha_{TE}$ as the frequency increases. For instance $\alpha_{TE}$ is equal to about 2.67 decibel per kilometer (dB/km) at about one THz and equal to about 0.67 dB/km at about 2.5 THz, which may be about three times larger than the attenuation of typical optical fibers for telecommunications and about 1000 times smaller than other reported lowest attenuation values at THz frequencies using dielectric/metal waveguides.

Additionally, plot 910 comprises a fourth attenuation curve 916 and a fifth attenuation curve 918 that illustrate theoretical attenuation $\alpha_{TEM}$ values (solid lines) and experimental attenuation $\alpha_{TEM}$ values (hollow circles) obtained for the TEM mode. The theoretical values are obtained using the relation $\alpha_{TEM}=2R_s/Z_0 b$ Unlike, the first attenuation curve 912a and the third attenuation curve 914, the fourth attenuation curve 916, and the fifth attenuation curve 918 show no cutoff in the frequency of the TEM mode. However, the fourth attenuation curve 916 and the fifth attenuation curve 918 also indicate a continuous increase in the attenuation of the TEM mode $\alpha_{TEM}$ as the frequency increases. The attenuation of the TEM mode is found larger than the attenuation of the $TE_1$ mode with the smaller cutoff frequency (second attenuation curve 912b) over a substantial portion of the frequency range.

The decrease in attenuation of the $TE_1$ mode may be explained in view of the attenuation analysis of FIG. 5 for the $TE_1$ mode. As shown above, the attenuation constant for the $TE_1$ mode may decrease as the frequency of the wave increases due to an increase in the incident angle of the wave in the PPWG and a decrease in the number of bounces between the plates along the PPWG.

Since the $TE_1$ mode may have lower attenuation values than the TEM mode as the frequency increases from the cutoff frequency, it may be advantageous to use the $TE_1$ mode instead of the TEM mode to propagate THz pulses and signals along a PPWG with lower losses. The attenuation for the $TE_1$ mode may further be reduced by increasing the separation distance between the plates of the PPWG and hence reducing the cutoff frequency. Additionally, increasing the separation distance between the plates and reducing the cutoff frequency may reduce the dispersion for the $TE_1$ mode, as shown above. However, increasing the separation distance between the plates may also allow additional modes, such as higher TE modes, to propagate with the $TE_1$. The additional modes may have higher cutoff frequencies than the $TE_1$ mode and hence may have higher attenuation and dispersion, which could deteriorate the THz signals or pulses.

Further, since the side areas between the plates and along the plates may not be bounded, a portion of the wave propagating in the PPWG may be diffracted along the edges of the plates, which may be referred to as lateral beam diffraction. Such wave diffraction may cause additional wave losses, which may be more significant as the wave propagates longer distances along the PPWG. To prevent or limit losses due to wave diffraction, each plate may have a curvature that is concave with respect to the other plate. The plates may have about the same or different curvature, which may focus the wave inside the PPWG and away from the edges of the plates at each bounce between the plates. Consequently, wave diffraction and diffraction losses may be reduced.

Figure 10:
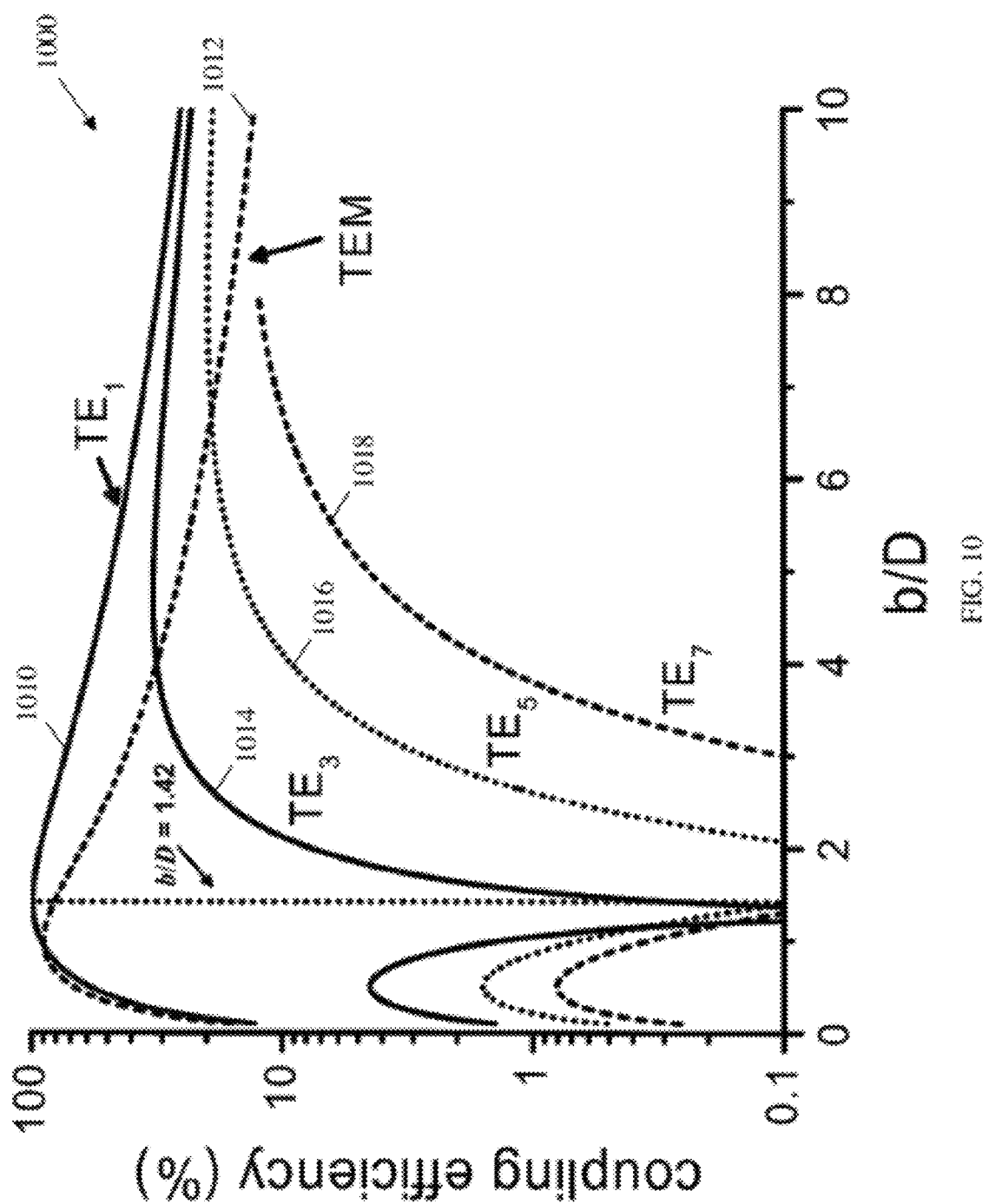
FIG. 10 is a chart of an embodiment of a coupling efficiency curve plot.

FIG. 10 illustrates a coupling efficiency curve plot 1000 for the TEM mode and a plurality of TE modes. The coupling efficiency curve plot 1000 comprises a first coupling efficiency curve 1010, a second coupling efficiency curve 1012, a third coupling efficiency curve 1014, a fourth coupling efficiency curve 1016, and a fifth coupling efficiency curve 1018. The first coupling efficiency curve 1010 represents the coupling efficiency for $TE_1$ mode in a PPWG and the second coupling efficiency curve 1012 represents the coupling efficiency for the TEM mode. The coupling efficiency may be the percent of energy that is coupled to the PPWG from the total transmitted wave energy. The coupling efficiency values are shown for a plurality of ratios from about zero to about 10. The ratios correspond to the values of the separation distance b between the plates divided by the values of a fraction D of the beam diameter (e.g., 1/e Gaussian amplitude size of the beam diameter).

The coupling efficiency values of the $TE_1$ mode are larger than the coupling efficiency values of the TEM mode along most of the b/D ratios. Accordingly, it may be advantageous to use the $TE_1$ mode instead of the TEM mode to initially couple more transmitted wave energy in the PPWG. For instance, the maximum coupling efficiency of the $TE_1$ mode is equal to about 99 percent where b/D is equal to about 1.42, while the maximum coupling efficiency of the TEM mode is equal to about 89 percent at b/D is about one. Further, the high coupling efficiency of the $TE_1$ mode may not be critically sensitive to the b/D ratio within a broad range of ratios. For example, the $TE_1$ mode may have about the same coupling efficiency (e.g., greater than 90 percent) over the range of ratios from about 1.14 to about 1.52.

The third coupling efficiency curve 1014, the fourth coupling efficiency curve 1016, and the fifth coupling efficiency curve 1018 represent the coupling efficiencies for the $TE_3$ mode, the fifth TE ($TE_5$) mode, and the seventh ($TE_7$) mode, respectively. The coupling efficiency values of the $TE_3$ mode, the $TE_5$ mode, and the $TE_7$ are smaller than the coupling efficiency values of the $TE_1$ mode at each b/D ratio. However, at some b/D ratio ratios, the coupling efficiencies of the $TE_3$ mode, the $TE_5$ mode, and/or the $TE_7$ may be substantially high and as such the wave in the PPWG may comprise the higher TE modes in addition to the $TE_1$ mode and therefore may suffer significant attenuation and/or dispersion. On the other hand, at some other b/D ratios, the coupling efficiencies of the $TE_3$ mode, the $TE_5$ mode, and/or the $TE_7$ may be relatively small or negligible and as such the wave in the PPWG may comprise substantially the $TE_1$ mode and may have lower attenuation and/or dispersion. For instance, at the maximum coupling efficiency of the $TE_1$ mode, where b/D is equal to about 1.42, the higher order TE modes may have minimum coupling efficiencies, which may be equal to about zero.

The b/D ratio may be adjusted by adjusting b, D, or both to achieve the single $TE_1$ mode propagation in the PPWG. For instance, the separation distance b between the plates may be increased to reduce the cutoff frequency of the $TE_1$ mode and hence the wave attenuation and dispersion. Since, increasing b may also allow higher TE orders to propagate in the PPWG, the diameter of the transmitted wave beam may also be adjusted (e.g., by refocusing the beam) to obtain an optimum b/D ratio. As such, the higher TE orders may not be excited and potential attenuation and dispersion may be suppressed.

Figure 11:
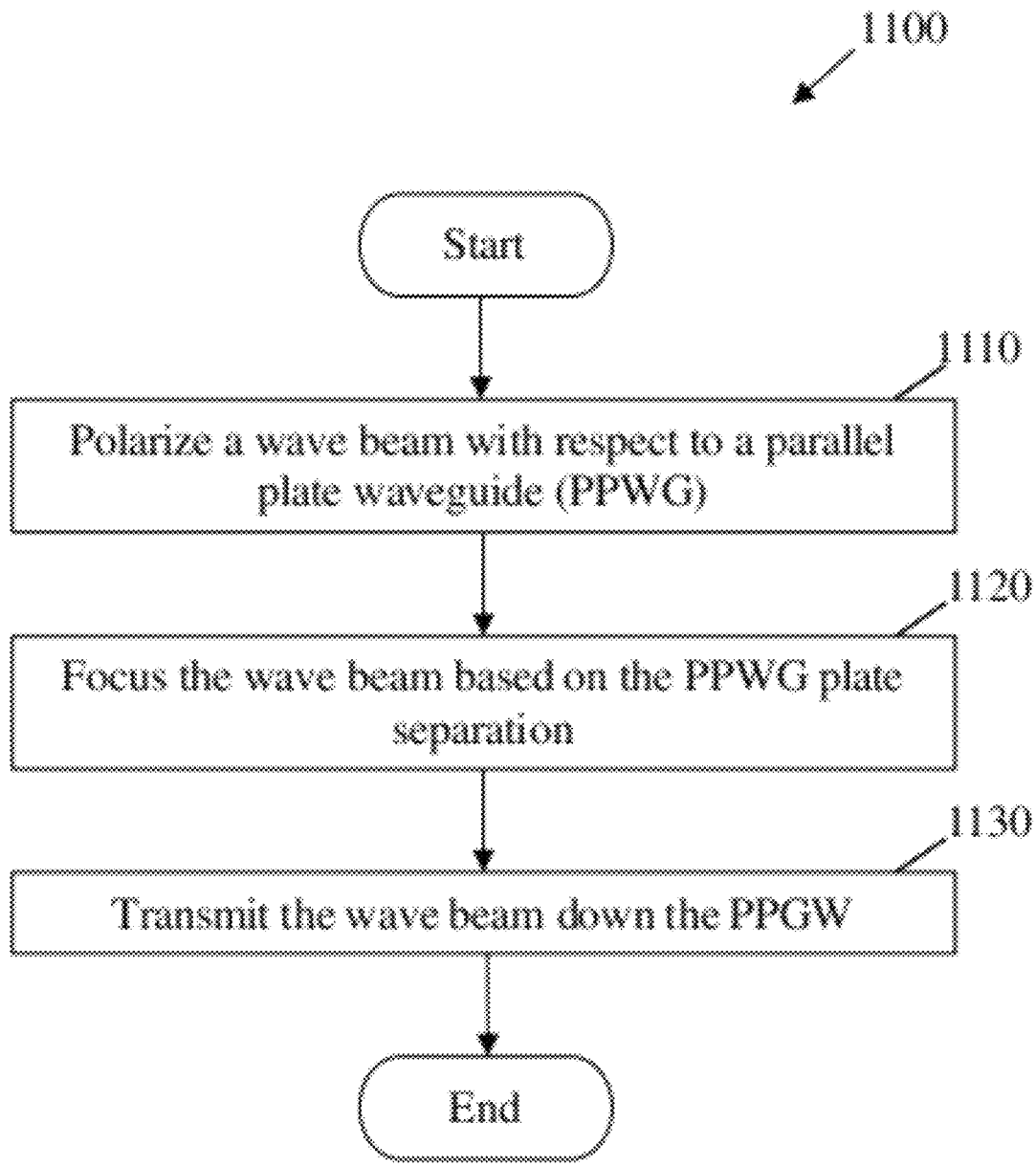
FIG. 11 is a flowchart of an embodiment of a THz wave propagation method.

FIG. 11 illustrates an embodiment of a THz wave propagation method 1100, which may be used to transmit and propagate a wave at THz frequencies in a PPWG. At block 1110, a wave beam may be polarized with respect to a PPWG. For instance, the wave beam may be initially transmitted at a single or a plurality of THz frequencies using an antenna or a laser. Additionally, the electric field component of the wave beam may be aligned, for instance, by rotating the antenna or laser, or using a polarizer, or alternatively rotating the PPWG, parallel to the width of the plates of the PPWG to excite the $TE_1$ mode in the PPWG. At block 1120, the wave beam may be focused based on the PPWG plate separation. The plates may be separated by a distance that reduces the cutoff frequency of the $TE_1$ mode to a frequency, which may be smaller than the range of transmitted frequencies or at the lower end of that range. In an embodiment, the wave beam may be a Gaussian beam, which may be focused using a lens. The lens may be aligned with the PPWG and may be positioned to adjust the diameter of the Gaussian beam according to the separation distance between the plates to improve the coupling to the $TE_1$ mode of the PPWG and prevent higher modes from propagating. At block 1130, the wave beam may be transmitted in the PPWG, for instance in the form of a modulated signal or time pulse, which may be used for telecommunications, sensing, or other THz applications.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    a parallel plate waveguide (PPWG) comprising two plates separated by a distance that supports a multimode wave; and
    a transmitter configured to emit a wave having a frequency in the range between about one hundred Gigahertz (GHz) to about ten terahertz (THz) and to couple to the $TE_1$ mode of the PPWG.

2. The apparatus of claim 1, wherein the distance between the plates is equal to about five millimeters (mm).

3. The apparatus of claim 2, wherein the wave has a frequency equal to about one THz, and wherein the wave is attenuated by about 2.7 dB/km.

4. The apparatus of claim 2, wherein the wave has a frequency equal to about 2.5 THz, and wherein the wave is attenuated by about 0.7 dB/km.

5. The apparatus of claim 2, wherein the PPWG has a cutoff frequency equal to about 30 Gigahertz (GHz).

6. The apparatus of claim 1, wherein the PPWG has negligible wave dispersion.

7. The apparatus of claim 1, wherein the PPWG has wave attenuation less than about one dB/km.

8. The apparatus of claim 1, wherein the distance between the plates is at least about five millimeters (mm).

9. An apparatus comprising:
    two plates substantially parallel to one another and separated by at least about five millimeters (mm); and
    an antenna coupled to the two plates and configured to transmit or receive a wave in the $TE_1$ mode having a frequency in the range between about one hundred Gigahertz (GHz) to about ten terahertz (THz).

10. The apparatus of claim 9, wherein the antenna transmits a wave through the plates, and wherein the wave has an electric field polarized parallel to the two plates.

11. The apparatus of claim 10, wherein the attenuation of the wave decreases as the frequency of the wave increases.

12. The apparatus of claim 10, wherein the wave is a Gaussian beam that has a diameter equal to about the distance between the two plates.

13. The apparatus of claim 12, wherein the Gaussian beam has a diameter equal to about ten mm.

14. The apparatus of claim 12, further comprising a lens coupled to the antenna and the two plates, and wherein the lens focuses the Gaussian beam.

15. The apparatus of claim 9, wherein the antenna receives a wave from the plates, and wherein the wave has an electric field polarized parallel to the plates.

16. The apparatus of claim 9, wherein the plates comprise aluminum.

17. The apparatus of claim 9, wherein the plates each have a curvature that is concave with respect to the other plate.

18. The apparatus of claim 9, wherein the plates are curved and redirect a propagating wave without substantial losses.

19. A method comprising:
polarizing and coupling an electromagnetic beam to the first transverse electric (TE0 mode with respect to a parallel plate waveguide (PPWG) comprising two plates;
adjusting the diameter of the electromagnetic beam based on the separation between the plates; and
sending the electromagnetic beam into the PPWG.

20. The method of claim 19, wherein the coupling efficiency of the electromagnetic beam to the PPWG is greater than or equal to about 90%.

21. The method of claim 19, wherein the diameter of the THz beam prevents multi-mode wave propagation.

22. The method of claim 19, wherein the distance between the two plates is at least about five millimeters (mm).

* * * * *

UNITED STATES PATENT AND TRADEMARK OFFICE
CERTIFICATE OF CORRECTION

PATENT NO. : 8,259,022 B2
APPLICATION NO. : 12/434454
DATED : September 4, 2012
INVENTOR(S) : Rajind Mendis et al.

It is certified that error appears in the above-identified patent and that said Letters Patent is hereby corrected as shown below:

Column 14, line 3, claim 19, replace "(TEO" with --(TE$_1$)--

Signed and Sealed this
Twenty-third Day of October, 2012

David J. Kappos
*Director of the United States Patent and Trademark Office*